United States Patent
Weng et al.

(10) Patent No.: US 9,417,833 B2
(45) Date of Patent: Aug. 16, 2016

(54) METHODS AND DEVICES FOR DATA TRANSFER

(71) Applicant: Tencent Technology (Shenzhen) Company Limited, Shenzhen (CN)

(72) Inventors: Yueteng Weng, Shenzhen (CN); Yaxuan Zhu, Shenzhen (CN); Yuejun Liu, Shenzhen (CN); Kai Liu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 449 days.

(21) Appl. No.: 14/108,218

(22) Filed: Dec. 16, 2013

(65) Prior Publication Data

US 2014/0173019 A1 Jun. 19, 2014

Related U.S. Application Data

(63) Continuation of application No. PCT/CN2013/086145, filed on Oct. 29, 2013.

(30) Foreign Application Priority Data

Dec. 17, 2012 (CN) .......................... 2012 1 0548270

(51) Int. Cl.
*G06F 15/167* (2006.01)
*G06F 3/14* (2006.01)
(Continued)

(52) U.S. Cl.
CPC . *G06F 3/14* (2013.01); *G06F 3/147* (2013.01); *G09G 2360/144* (2013.01); *G09G 2380/16* (2013.01); *H04W 76/02* (2013.01)

(58) Field of Classification Search
USPC ......................... 709/201, 205, 213, 217, 245
See application file for complete search history.

(56) References Cited

U.S. PATENT DOCUMENTS 7,925,800 B2 * 4/2011 Cheng ................. G11B 27/105
710/13
8,631,328 B2 * 1/2014 Kim ....................... G06F 3/017
715/706

(Continued)

FOREIGN PATENT DOCUMENTS

CN 1592204 A 3/2005
CN 1838604 A 9/2006

(Continued)

OTHER PUBLICATIONS

Tencent Technology, ISRWO, PCT/CN2013/086145, Feb. 20, 2014, 8 pgs.

(Continued)

*Primary Examiner* — Liangche A Wang
(74) *Attorney, Agent, or Firm* — Morgan, Lewis & Bockius LLP (57) ABSTRACT

The present application discloses methods and devices for data transfer and particularly data transfer between mobile terminals and a display device. The display device may connect to a uniquely identified server based on a device identifier corresponding to the display device. In addition, the display device may connect to the server through a default connection setup embedded in the device identifier. Mobile terminals may be searched and identified by terminal identifiers so that the display device may establish communication channels with the mobile terminals. After adding the mobile terminals to the contact lists of the display device, different display regions of the display device may be designated to the mobile terminals so that the regions may display the digital contents sent from the mobile terminals to the display device. In addition, the regions may be further selected to display the digital contents in more detail.

20 Claims, 7 Drawing Sheets

(51) Int. Cl.
*G06F 3/147* (2006.01)
*H04W 76/02* (2009.01)

(56) References Cited

U.S. PATENT DOCUMENTS

| | | | |
|---|---|---|---|
| 2010/0088366 A1* | 4/2010 | Li | H04N 1/00198 709/203 |
| 2013/0179201 A1* | 7/2013 | Fuerstenberg | G06Q 30/0255 705/5 |
| 2013/0347087 A1* | 12/2013 | Smith | G06F 21/36 726/7 |
| 2014/0019311 A1* | 1/2014 | Tanaka | G06Q 10/083 705/27.2 |

FOREIGN PATENT DOCUMENTS

| | | |
|---|---|---|
| CN | 101068225 A | 11/2007 |
| CN | 101201253 A | 6/2008 |
| CN | 201114512 Y | 9/2008 |
| CN | 101529835 A | 9/2009 |
| CN | 101552787 A | 10/2009 |
| CN | 101631388 A | 1/2010 |

OTHER PUBLICATIONS

Tencent Technology, IPRP, PCT/CN2013/086145, Jun. 23, 2015, 5 pgs.

* cited by examiner

METHODS AND DEVICES FOR DATA TRANSFER

RELATED APPLICATIONS

This application is a continuation application of PCT Patent Application No. PCT/CN2013/086145, entitled "METHODS AND DEVICES FOR DATA TRANSFER" filed on Oct. 29, 2013, which claims priority to Chinese Patent Application No. 201210548270.7, "Methods and Devices for Data Transfer," filed on Dec. 17, 2012, both of which are hereby incorporated by reference in their entirety.

FIELD OF THE INVENTION

The present application relates to the information technology field, in particular to methods and devices for data transfer.

BACKGROUND OF THE INVENTION

Electronic photo frames are also called digital photo frames, which are devices used to display digital photos without a computer. Some digital photo frames may display photos on televisions. Presently, digital photo frames use external data storage devices such as flash drives, SD cards, and MMC cards to store digital contents to be displayed. In addition to photos, some digital photo frame may also be able to play audios and videos.

Since digital photo frames typically require external data storage to transfer pictures, audio, video and other data, their use and popularity have been limited by such inconvenience. With the increasing popularity of tablet PCs, which have similar shapes as traditional digital photo frames, some of the disadvantages of the digital photo frames regarding data transmission are reduced. Tablet PCs may use USB interfaces, card reader interfaces, wireless local area network, or mobile communication network to transfer data, thus greatly improving convenience and efficiency.

However, due to its versatility, tablet PCs usually provides a common software platform. When a user needs a particular application, he/she can search, download, and install the appropriate software. For example, the user can install a browser software to view and download pictures; the user can also install instant messaging software to exchange and share pictures with other users. However, this approach requires the user to not only download and install a particular software, but also get familiar with the functions of the software before data transfer, resulting in complex operation.

Accordingly, it is necessary and desirable to provide a new technology, so as to resolve the technical problem and improve the above-mentioned approach.

SUMMARY

The above deficiencies and other problems associated with data transfer are reduced or eliminated by the invention disclosed below. In some embodiments, the invention is implemented in a computer system that has one or more processors, memory and one or more modules, programs or sets of instructions stored in the memory for performing multiple functions. Instructions for performing these functions may be included in a computer program product configured for execution by one or more processors.

One aspect of the invention involves a computer-implemented method performed by a display device. The display device may connect to a server based on a device identifier corresponding to the display device, wherein the display device is uniquely identified by the device identifier at the server and the display device connects to the server through a default connection setup embedded in the device identifier. The display device may then receive communication requests from the server, wherein each communication request includes a terminal identifier of a respective mobile terminal at the server. In response to the communication requests: the display device may establish communication channels between the display device and the mobile terminals through the server; add the terminal identifiers of the mobile terminals to a contact list of the display device; and designate different regions of the display device as corresponding to the mobile terminals. In addition, the display device may receive digital content from one of the mobile terminals and display the digital content at a designated region of the display device associated with the corresponding mobile terminal.

Another aspect of the invention involves a computer system. The computer system may comprise a server, one or more mobile terminals, and a display device, the display device having one or more processors, memory, and one or more programs modules stored in the memory and configured for execution by the one or more processors, the one or more program modules including: a connecting module configured to connect to the server based on a device identifier corresponding to the display device, wherein the display device is uniquely identified by the device identifier at the server and the display device connects to the server through a default connection setup embedded in the device identifier; an identifying module configured to receive communication requests from the server, wherein each communication request includes a terminal identifier of a respective mobile terminal at the server; a response module, in response to the communication requests, configured to: establish communication channels between the display device and the mobile terminals through the server, add the terminal identifiers of the mobile terminals to a contact list of the display device, and designate different regions of the display device as corresponding to the mobile terminals; and a receiving module having a receiving subunit and a display subunit, wherein: the receiving subunit is configured to receive digital content from one of the mobile terminals; and the display subunit is configured to display the digital content at a designated region of the display device associated with the corresponding mobile terminal.

Another aspect of the invention involves a non-transitory computer readable storage medium having stored therein instructions, which, when executed by a display device, cause the server to: connect to a server based on a device identifier corresponding to the display device, wherein the display device is uniquely identified by the device identifier at the server and the display device connects to the server through a default connection setup embedded in the device identifier; receive communication requests from the server, wherein each communication request includes a terminal identifier of a respective mobile terminal at the server; in response to the communication requests: establish communication channels between the display device and the mobile terminals through the server, add the terminal identifiers of the mobile terminals to a contact list of the display device, and designate different regions of the display device as corresponding to the mobile terminals; receive digital content from one of the mobile terminals; and display the digital content at a designated region of the display device associated with the corresponding mobile terminal.

Some embodiments may be implemented on either the device side or the server side of a device-server network environment.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

Figure 7:
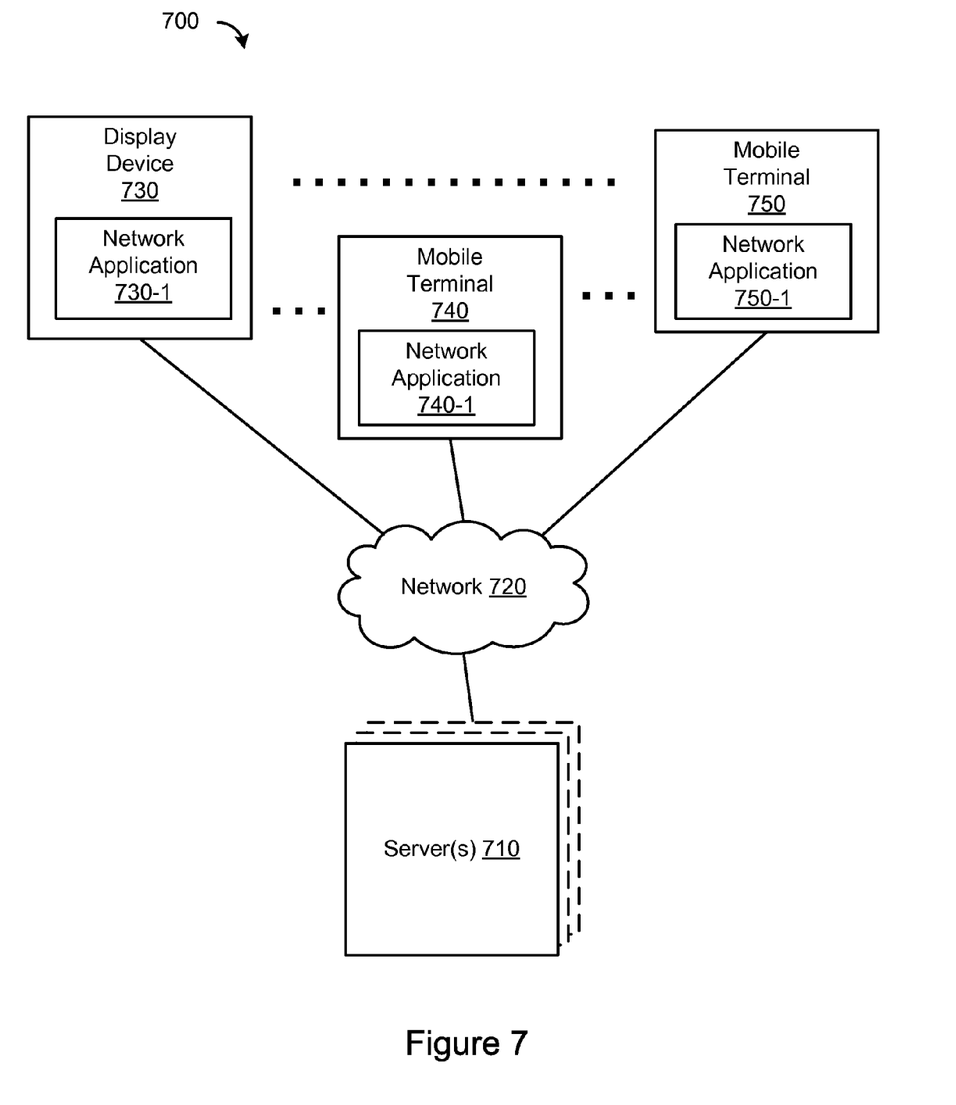
FIG. 7 is a block diagram of a network environment in accordance with some embodiments of the present application.

FIG. 7 is a block diagram of a network environment in accordance with some embodiments of the present application. The network environment 700 includes one or more servers 710, one display device 730, and one or more mobile terminals (730, 740). The display device and the mobile terminals are connected to the servers via a network 720 (e.g., the Internet). Meanwhile, different mobile terminal may also be able to communicate with each other via the network 720. Through the network 710, the display device 730 and the mobile terminals 740 and 750 in the network environment 700 may exchange information with one another using network applications 730-1, 740-1, and 750-1. The server 710 interacts with the display device 730 and the mobile terminals (740, 750) and maintains communication channels between the display device and the mobile terminals.

Figure 1:
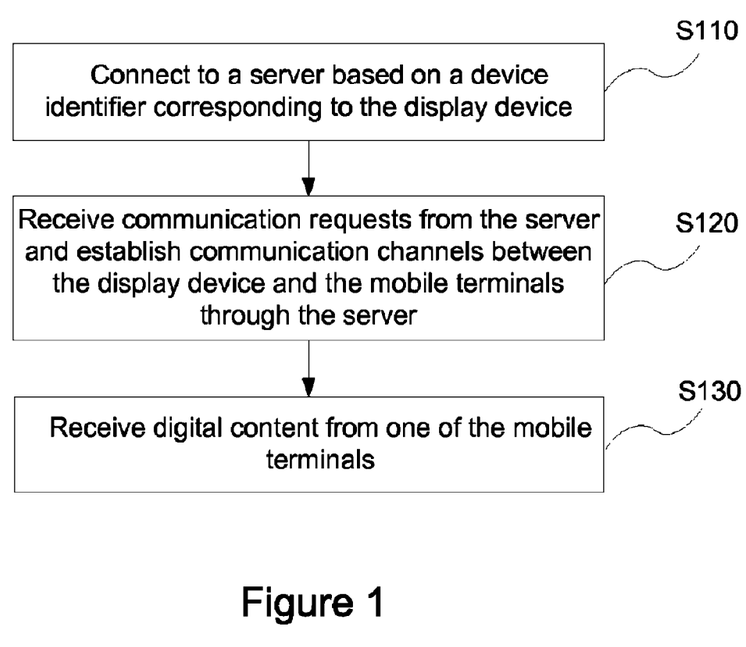
FIG. 1 is a flowchart illustrative of a method for data transfer between a display device and one or more mobile terminals in accordance with some embodiments of the present application.

FIG. 1 is a flowchart illustrative of a method for data transfer between a display device and one or more mobile terminals in accordance with some embodiments of the present application.

Step S110 shows that the display device may connect to a server based on a device identifier corresponding to the display device. In some embodiments, the display device is uniquely identified by the device identifier at the server and the display device connects to the server through a default connection setup embedded in the device identifier.

The display device may be any computing device that has networking capability and is able to display digital contents encoding pictures, photos, audios, and/or videos. The display device may be a smart phone, a tablet computer, a digital photo frame, a laptop computer, or a desktop computer. The server may be any computing device that that is capable of providing data processing and networking capabilities.

As shown by Step S120, the display device may receive communication requests from the server and establish communication channels between the display device and the mobile terminals. In some embodiments, each communication request may include a terminal identifier of a respective mobile terminal at the server.

As shown by Step S130, after the communication channels are established, the display device may receive digital content from one of the mobile terminals. In addition, the display device may display the digital content at a designated region of the display device associated with the corresponding mobile terminal.

Figure 2:
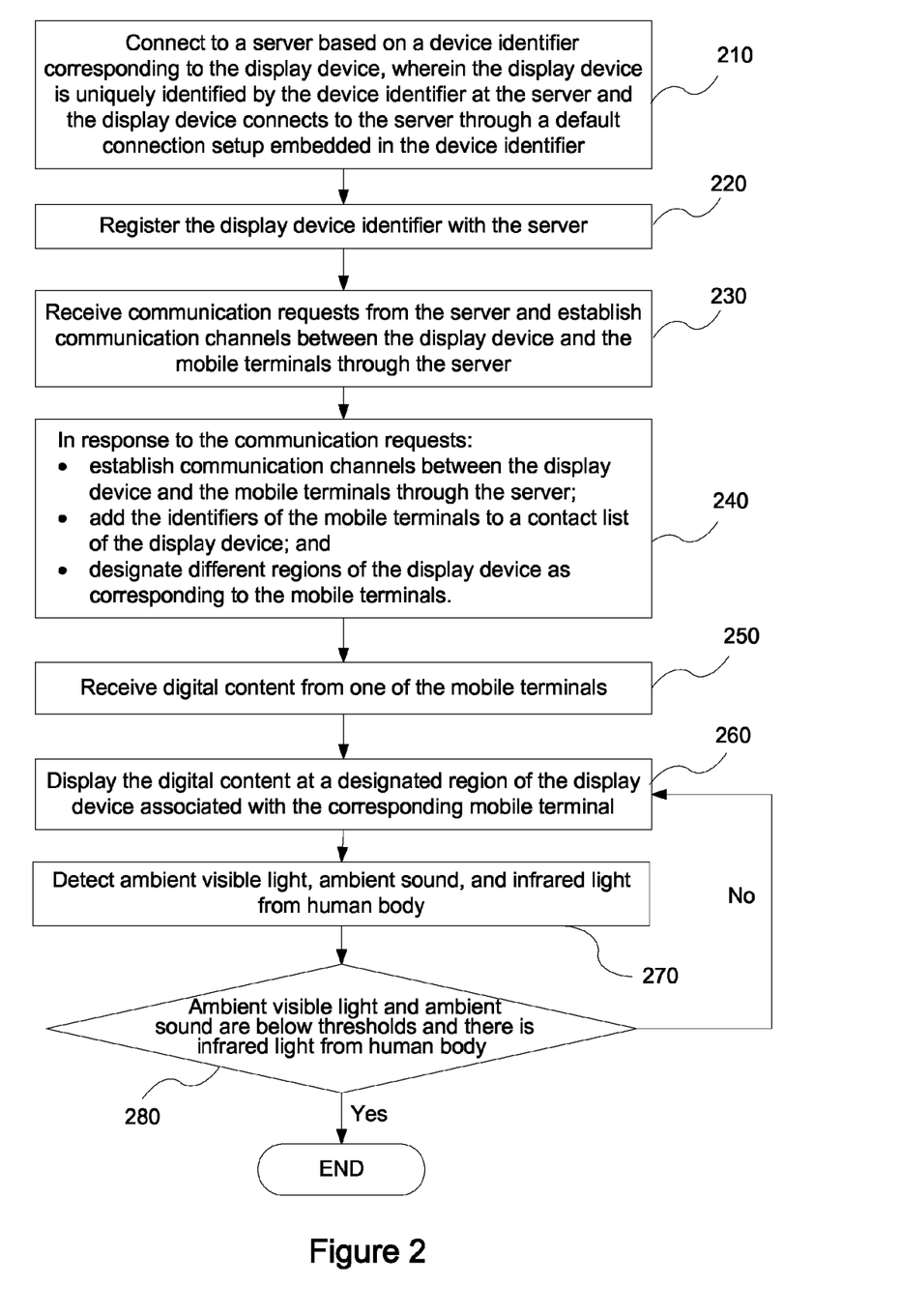
FIG. 2 is a detailed flowchart illustrative of the method for data transfer between a display device and one or more mobile terminals in accordance with some embodiments of the present application.

FIG. 2 is a detailed flowchart illustrative of the method for data transfer between a display device and one or more mobile terminals in accordance with some embodiments of the present application. FIG. 2 provides more steps and optional features for the method described in FIG. 1.

Figure 6:
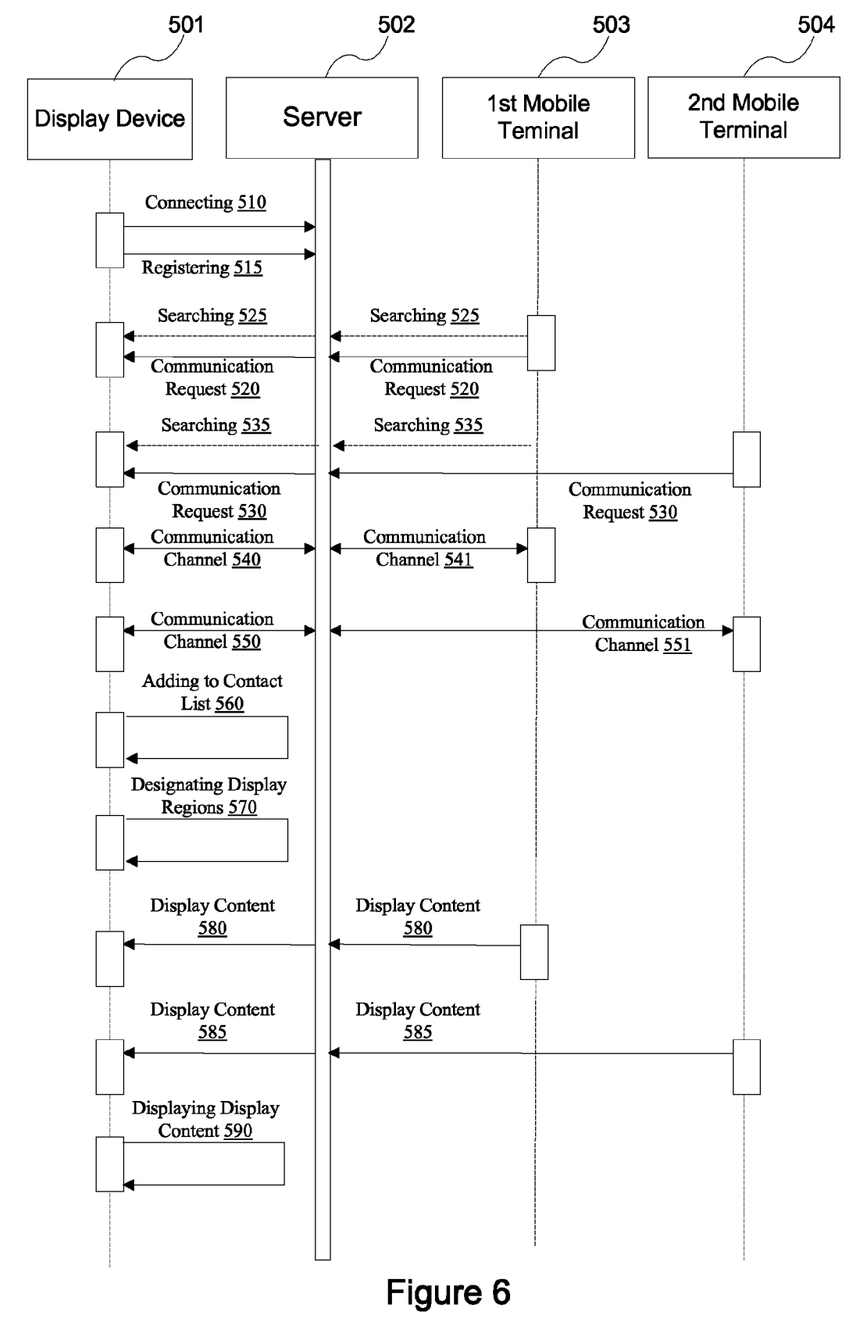
FIG. 6 is a schematic illustration of how a server, a display device, and two mobile terminals interact to establish communications and transfer data in accordance with some embodiments of the present application.

FIG. 6 is a schematic illustration of how a server 502, a display device 501, and two mobile terminals 503 and 504 interact to establish communications and transfer data in accordance with some embodiments of the present application. FIG. 6 provides an exemplary process for the method disclosed in FIG. 2.

Referring to FIG. 2, Step 210 shows that the display device may connect to a server based on a device identifier corresponding to the display device, wherein the display device is uniquely identified by the device identifier at the server and the display device connects to the server through a default connection setup embedded in the device identifier.

The device identifier may be any device, chip, symbol, code, data, or electronic or magnetic information item that may be used to identify the display device and contain certain information. The device identifier may have a one-to-one corresponding relationship with the display device. In some embodiments, the device identifier is an identifier based on the radio-frequency identification (RFID) technology or other wireless networking technologies. In some embodiments, the device identifier may be a chip identification code or a read-only memory embedded in the display device. In some other embodiments, the device identifier may be a barcode (e.g. 2-dimension barcode) attached to the external surface of the display device or embedded in the display device. The device identifier (e.g. barcode) may be acquired by the server or other devices or terminals that may be connected to the display device. When the device identifier is a barcode or a RFID tag, the device identifier may be read by another device with scanning or radio-frequency detection. In general, the scanning or detecting apparatus must be in close proximity of the display device, making the user of the display device to be aware that the device identifier is being read. Such an approach may help to protect privacy and avoid unwanted access and harassment.

The server, as indicated above, may be any computing device. The server may comprise network applications that may be used to connect to the display device and the mobile terminals. In some embodiments, the server, together with the network application, is uniquely identified by the device identifier—the device identifier does not identify other systems or platforms to be used for the data transfer except the server. The connection process between the display device and the server may be embedded in the device identifier, allowing the display device to connect to the server through a default setup. With such an approach, the user of the display device does not need to specifically download an application program for data transfer. Moreover, the user does not need to specifically set up the network with the server because the connection is automatically configured based on the information encoded by the device identifier. In some embodiments, the device identifier is connected to the server by visiting fixed IP addresses or domain names associated with the server, setting up a network connection with the server.

Referring to FIG. 2, Step 220 shows that the display device may be registered with the server. The registration process may take place before or after the connection is established. For example, the manufacturer of the display device may register all such devices with the server before the display device is shipped to a user. On the other hand, the display device maybe registered by the user of the display device with the server once a connection between the display device and the server is established. Registering the display device may involve providing information about the display device to the server, such information may include but not limited to: the device identifier and its contents, the make and model of the display device, and the location of the display device. Registering the display device may also involve setting up an account for the display device, wherein the account may be used to store digital contents and other information items associated with the display device.

The device identifier allows the display device to connect to the server with a default setup. In addition, the device identifier allows the display device to be searched and readily identified. Other devices connected to the server may use various criteria to search for display devices and the most direct approach is to search for the device identifier. In addition, other information associated with the display device, e.g. location, may also be used for searching the display device.

Referring to FIG. 6, the display device 501 may connect to the server 502 in step 510, as indicated in step 210 of FIG. 2. In addition, the display device 501 may register with the server 502 in step 515, as indicated in step 220 of FIG. 2.

Referring to FIG. 2, the display device may receive communication requests from the server, wherein each communication request includes a terminal identifier of a respective mobile terminal at the server. The mobile terminals are the devices that may transfer data to the display device and receive data from the display device. The mobile terminals may be any computing devices as indicated for the display device, except that it is not required to have displaying capabilities. In some embodiments, the mobile terminals may be smart phones, tablet computers, PDAs, or digital photo frames.

Each mobile terminal may have a terminal identifier, wherein the terminal identifier may be any device, chip, code, symbol, data, or electronic or magnetic information item as described for the device identifier. Each terminal identifier may have a one-to-one corresponding relationship with a particular mobile terminal and may be used to identify that terminal. The terminal identifier may contain or encode information regarding the mobile terminal so that the mobile terminal may be found by the server. As the display device, the mobile terminals may be registered with the server and accounts may be set up for the mobile terminals, respectively.

The mobile device may be connected to the server and further to the display device through a number of ways. In some embodiments, the server is a uniquely identified system or platform uniquely corresponds to the terminal identifier. Similar to the display device identifier, the terminal identifier may contain or encode a default connection setup to initiate and process the connection between the mobile terminal and the server.

Through the server, the mobile terminal may send a connecting request to the display device. In some embodiments, the mobile terminal may find the display device by searching for the device identifier of the display device or other information associated with the display device, e.g. searching for display devices close to a certain location. The mobile terminal may acquire the device identifier of the display device through various processes, such as scanning the device identifier when the device identifier is a barcode, or receiving the device identifier when the device identifier may be transferred via radio or other wireless signals. However, as indicated above, it is not required for the mobile terminal to acquire the device identifier before connecting to the display device. The mobile terminal may send the connecting request to the display device, through the server, using other means to identify the display device. It is also possible that the connecting process is initiated by the display device, after the display device finds the mobile terminal, either by search the terminal identifier or through other means. The display device may send connecting requests to the mobile terminals, respectively, through the server, so that the mobile terminals may process the requests and connect to the display device.

In some embodiments, each connecting request from the mobile terminals may contain the terminal identifier for the corresponding mobile terminal. Inclusion of the terminal identifier allows identification of the mobile terminal by the server and by the display device, and further facilitates connection between the display device and the mobile terminal, through the server.

Referring to FIG. 6, the first mobile terminal 503 and the second mobile terminal 504 may search for the display device 501 through the server 502 in steps 525 and 535, respectively. In addition, the first mobile terminal 503 and the second mobile terminal 504 may send connecting requests through the server 502 to the display device in steps 520 and 530, respectively.

As indicated above, the embodiment shown in FIG. 6 is considered an example of the interactions between the devices. The number of devices involved in the current system may vary according to the needs of the users, the capacity of the server and the application programs, and the hardware capabilities of the display devices and mobile terminals. There may be multiple display devices and/or multiple mobile terminals, forming a number of connections that allow data transfer.

To facilitate the process of establishing connections, some automatic processes may be adopted, especially when there are multiple display devices and/or multiple mobile terminals. For example, the device identifiers and/or the terminal identifiers may be transferred automatically after certain actions. For instance, the user may shake the display device or the mobile terminal; the sensors in the display device or mobile terminal may detect such motions; then the device identifiers or terminal identifiers may be automatically transferred to the server; connecting requests from the display devices or mobile terminals may also be transferred to the server; when certain conditions are satisfied, e.g. close to a particular location (within 30 meters for instance) or within a particular time period (within one minute for instance), shaking a mobile terminal or display device may initiate the process of receiving the connecting request and further processing. The identifiers may be transferred and acquired through the near field communication (NFC) technology. Moreover, the identifiers may be barcodes that may be scanned or RFID tags that may be detected.

Referring to FIG. 2, step 240 shows that in response to the connecting requests from the mobile terminals, the display device may (1) establish communication channels between the display device and the mobile terminals through the server, (2) add the terminal identifiers of the mobile terminals to a contact list of the display device, and (3) designate different regions of the display device as corresponding to the mobile terminals.

Since both display device and the mobile terminals are connected to the server, either hen the display device identifies the mobile terminals or when the mobile terminals identify the display device, communication channels may be established between the display device and the mobile terminals. The data transfer may be based on general packet radio service (GPRS) technology, wifi, or any generation of mobile telecommunication (e.g. 3G, 4G, etc.) technology.

To keep records and monitor the mobile terminals, the display device may add the terminal identifiers to a contact list of the display device. The contact list may list and rank the mobile terminals based on certain criteria such as the serial numbers or models of the mobile terminals. In addition, each mobile terminal may add the device identifier to a terminal contact list associated with the mobile terminal.

As indicated above, the display device may designate different regions of the display device as corresponding to the mobile terminals. In some embodiments, the regions appear on the display interface (e.g. screen) of the display device. In some embodiments, the regions may be separate mini-screens or buttons with background lights. The regions may be preset so that some regions are not-designated and may later become designated. Alternatively, the regions may be created when the display device is connected to a new mobile terminal. The regions may be aligned, cascaded, or arranged in any distinguishable pattern on the display device so that each region may be distinct from another region and the user may locate a certain region without too much difficulty.

Referring to FIG. 6, after the display device 501 receives the connecting requests 520 and 530 through the server 501 from the first mobile terminal 503 and the second mobile terminal 504, respectively, the display device 501 may establish communication channels 540 and 550 with the first mobile terminal 503 and the second mobile terminal 504, respectively, through the server 502. With step 560, the display device 501 may added the terminal identifiers of the first mobile terminal 503 and second terminal 504 to a contact list of the display device. The display device 501 may also designate different regions in step 570 so that the regions correspond to the first mobile terminal 503 and the second mobile terminal 504.

Referring to FIG. 2, step 250 shows that the display device may receive digital contents from one of the mobile terminals. The digital contents may be any informational items such as pictures, photos, audio, video, and other data. In some implementations, the data transfer may be based on general packet radio service (GPRS) technology, wifi, or any generation of mobile telecommunication (e.g. 3G, 4G, etc.) technology. The designated regions may be used to provide alerts that digital contents are being transferred to the display device from the corresponding mobile terminal. For example, a designated region may flash when the display device is receiving digital contents from the mobile terminal associated with the flashing region. The regions may also be used to display the status of the mobile terminals. For example, if a mobile terminal is blocked by a user of the display device, the region designated to the mobile terminal may show that the terminal is blocked.

Referring to FIG. 2, step 260 shows that the display device may display the digital content at a designated region of the display device associated with the corresponding mobile terminal. Such an approach allows the user to clearly identify what digital content is sent by which mobile device. As indicated above, the regions may be arranged in any pattern. For example, the regions may be aligned on the screen of the display device without any overlap, allowing full display of the digital contents and clear view by the user. The regions may also be used as a selection interface. For example, by clicking a particular region, the user may prompt the digital content displayed in that region to be expanded to occupy the entire screen. The user may also be able to control the size, brightness, resolution, and other parameters of individual regions to facilitate viewing.

In some embodiments, the digital contents may be displayed according to preset formats. For example, user A of a mobile terminal may send photo P1 to user B of a display device, together with an audio message describing the photo P1 as "this is a picture I took in the United States." After receiving the digital content, the display device may be used to display the photo P1 and play the audio at the same time. As another example, user A of a mobile terminal may send photo P2 to user B of a display device, together with a text message describing the photo P2 as "this is a night scene of London." After receiving the digital content, the display device may be used to display the photo P2 with the text at the bottom of the photo or display the photo P2 and the text sequentially. When there are multiple information items includes in the digital contents, the display device may display the contents in preset formats, either based on the association of the information items or simple in sequence. In some embodiments, the user of the display device may be able to set the preset formats.

It should also be noted that the display device is not limited to receiving digital contents. In some embodiments, the display device may obtain a second device identifier corresponding to a second display device, search for the second display device through the server based on the second device identifier, and sending digital contents to the second display device so that the second display device may display the digital contents. The display device may also send digital contents to the mobile terminals that have communication channels with the display device.

Referring to FIG. 6, the display device 501 may receive digital contents 580 and 585 from the first mobile terminal 503 and the second mobile terminal 504, respectively, through the server 502. In step 590, the display device 501 may display the digital contents sent by the first mobile terminal 503 and the second mobile terminal 504.

Referring to FIG. 2, step 270 shows that the display device may detect ambient visible light, ambient sound, and infrared light from human body. As shown in step 280, when the ambient visible light and ambient sound are below thresholds and there is infrared light from human body, it is highly possible that lights are turned off and there are people who are ready to go to sleep or are asleep close to the display device. When such condition is satisfied, the display by the display device may be terminated or suspended. If the condition in step 280 is not satisfied, the display continues.

FIGS. 3-5 and 8 illustrate the computer systems that may be used to perform the methods described above. To avoid redundancy, not all the details and variations described for the method are herein included for the devices. Such details and variations should be considered included for the description of the devices as long as they are not in direct contradiction to the specific description provided for the devices.

Figure 3:
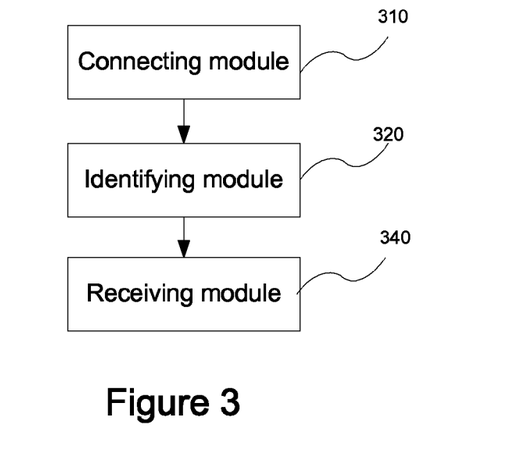
FIG. 3 is a block diagram illustrative of a display device comprising modules configured to transfer data with one or more mobile terminals in accordance with some embodiments of the present application.

FIG. 3 is a block diagram illustrative of a display device comprising modules configured to transfer data with one or more mobile terminals in accordance with some embodiments of the present application. The display device may have one or more processors; memory; and one or more programs modules stored in the memory and configured for execution by the one or more processors, the one or more program modules including: a connecting module 310 configured to connect to a server based on a device identifier corresponding to the display device, wherein the display device is uniquely identified by the device identifier at the server and the display device connects to the server through a default connection setup embedded in the device identifier; an identifying module 330 configured to receive communication requests from the server, wherein each communication request includes a terminal identifier of a respective mobile terminal at the server; and a receiving module 340 configured to receive digital content from one of the mobile terminals.

Figure 4:
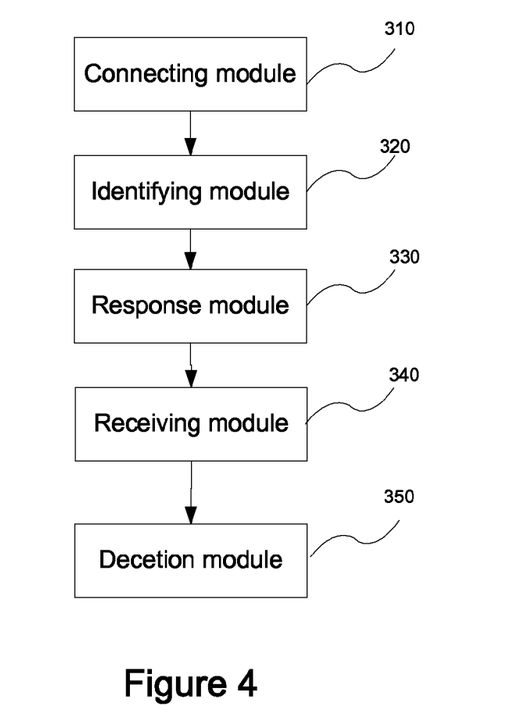
FIG. 4 is a block diagram illustrative of a display device comprising modules configured to transfer data with one or more mobile terminals in accordance with some embodiments of the present application, providing more details.

FIG. 4 is a block diagram illustrative of a display device comprising modules configured to transfer data with one or more mobile terminals in accordance with some embodiments of the present application, providing more details. The display device may have one or more processors; memory; and one or more programs modules stored in the memory and configured for execution by the one or more processors, the one or more program modules including: a connecting module 310 configured to connect to the server based on a device identifier corresponding to the display device, wherein the display device is uniquely identified by the device identifier at the server and the display device connects to the server through a default connection setup embedded in the device identifier; an identifying module 320 configured to receive communication requests from the server, wherein each communication request includes a terminal identifier of a respective mobile terminal at the server; a response module 330, in response to the communication requests, configured to: establish communication channels between the display device and the mobile terminals through the server, add the terminal identifiers of the mobile terminals to a contact list of the display device, and designate different regions of the display device as corresponding to the mobile terminals; a receiving module 340 configured to receive digital content from one of the mobile terminals display the digital content at a designated region of the display device associated with the corresponding mobile terminal; and a detection module 350 configured to detect ambient visible light, ambient sound, and infrared light, and to terminate displaying the digital contents by the receiving module 340 when ambient visible light and ambient sound are below thresholds and there is infrared light from human body.

Figure 5:
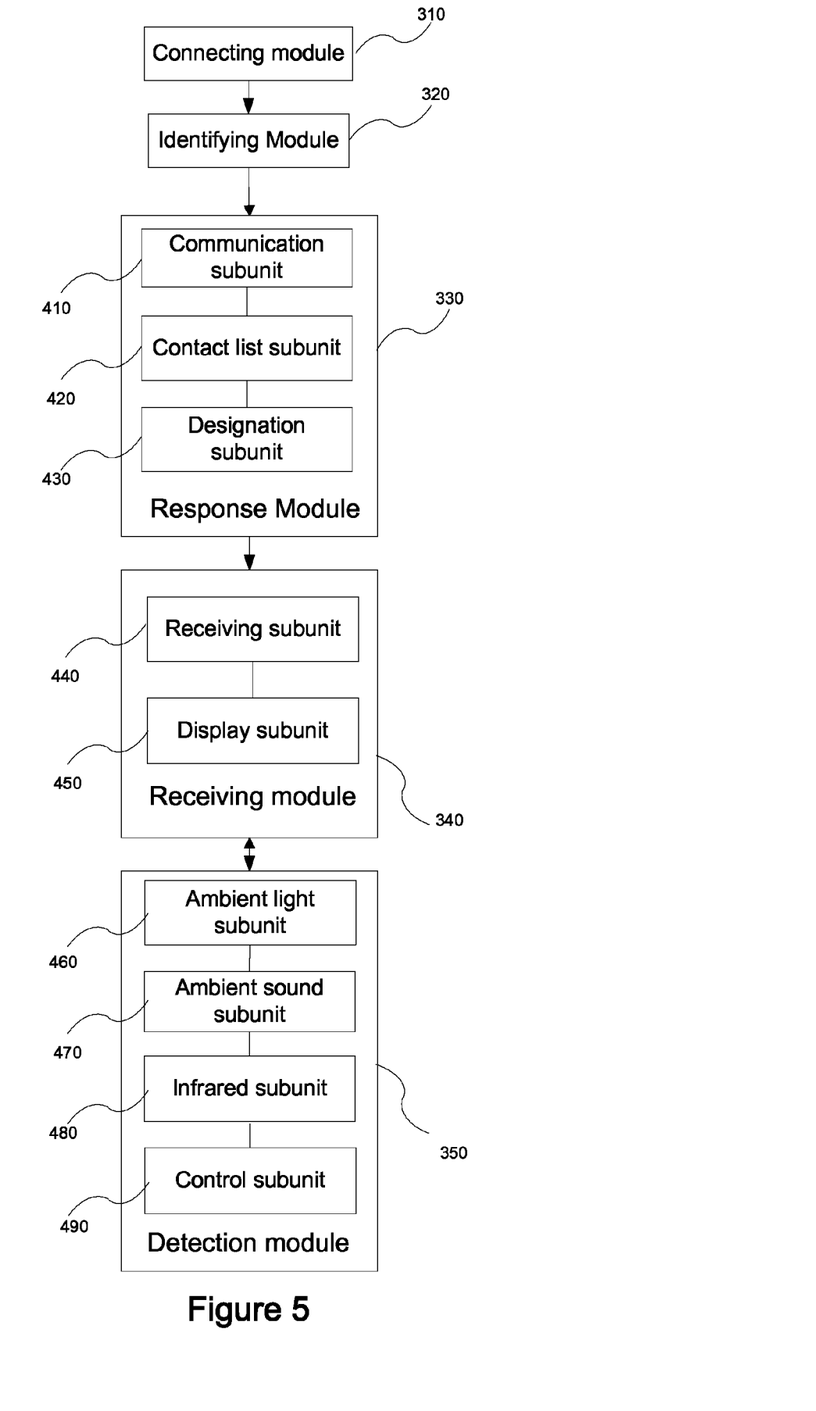
FIG. 5 is a block diagram illustrative of a display device comprising modules configured to transfer data with one or more mobile terminals in accordance with some embodiments of the present application, providing more details for the response module, the receiving module, and the detection module.

FIG. 5 is a block diagram illustrative of the display device comprising modules configured to transfer data with one or more mobile terminals in accordance with some embodiments of the present application, providing more details for the response module 330, the receiving module 340, and the detection module 350. The response module 330 may comprise a communication subunit 410, a contact list subunit 420, and a designation subunit 430, wherein, in response to the communication requests: the communication subunit 410 is configured to establish communication channels between the display device and the mobile terminals through the server; the contact list subunit 420 is configured to add the terminal identifiers of the mobile terminals to a contact list of the display device; and the designation subunit 430 is configured to designate different regions of the display device as corresponding to the mobile terminals. The receiving module 340 may comprise a receiving subunit 440 and a display subunit 450, wherein: the receiving subunit 440 is configured to receive digital content from one of the mobile terminals; and the display subunit 450 is configured to display the digital content at a designated region of the display device associated with the corresponding mobile terminal. In addition, the detection module 350 may comprise an ambient light subunit 460, an ambient sound subunit 470, a infrared subunit 480, and a control subunit 490, wherein: the ambient light subunit 460 is configured to detect ambient visible light, the ambient sound subunit is configured to detect ambient sound, the infrared subunit is configured to detect infrared light from human body, and the control subunit is configured to terminate displaying the digital contents by the receiving module when ambient visible light and ambient sound are below thresholds and there is infrared light from human body.

As indicated above, the device identifier may be a barcode encoding display device information corresponding to the display device and the terminal identifier may be a barcode encoding terminal information corresponding to the mobile terminal. In addition, the connecting module 310 may be further configured to register the display device identifier with the server. To connect to other display devices, the identifying module 320 may be further configured to obtain a second device identifier corresponding to a second display device and search for the second display device through the server based on the second device identifier; and the receiving module 340 may be further configured to send digital contents to the second display device so that the second display device displays the digital contents.

Figure 8:
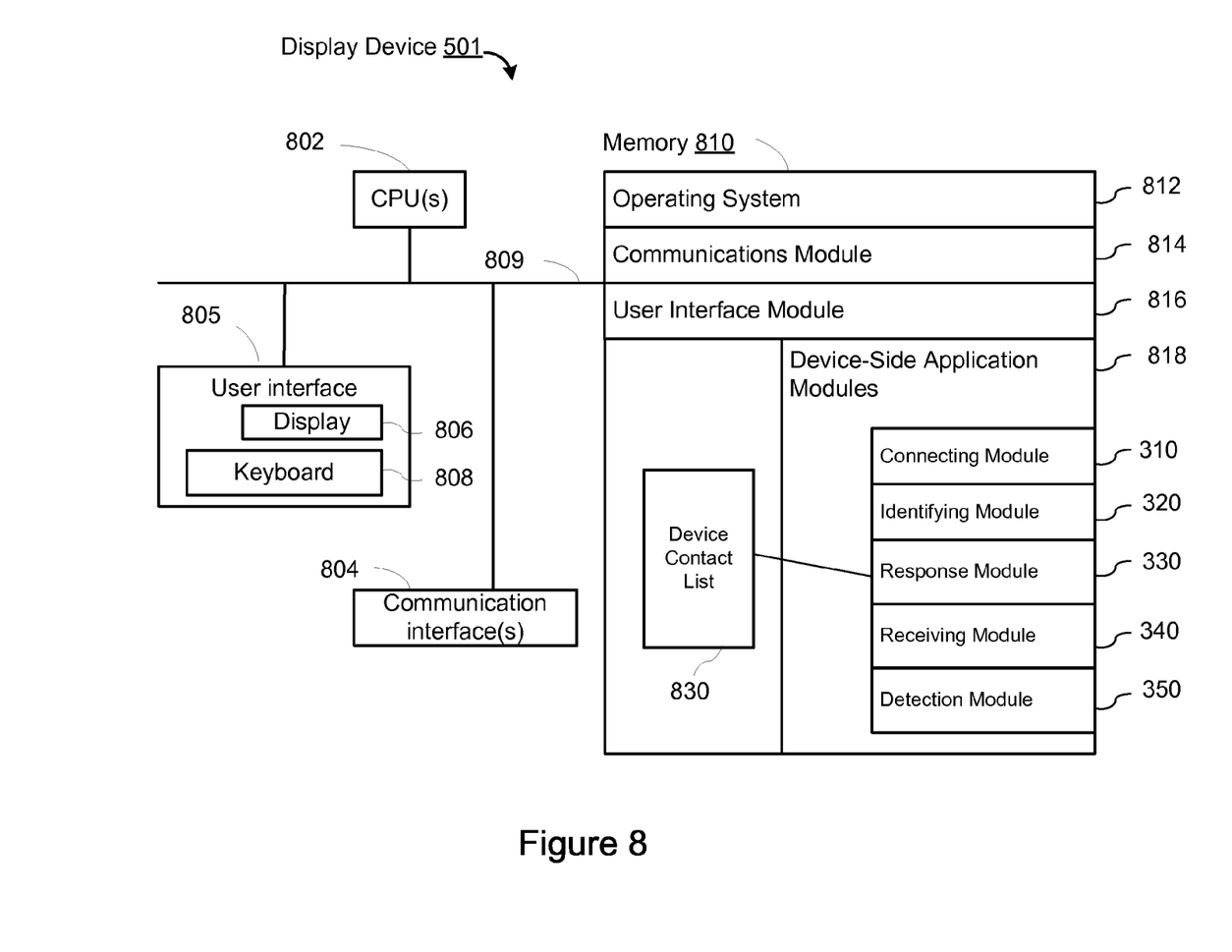
FIG. 8 is a block diagram of a display device in accordance with some embodiments of the present application.

FIG. 8 is a block diagram of a display device in accordance with some embodiments of the present application. The exemplary display device 501 typically includes one or more processing units (CPU's) 802, one or more network or other communications interfaces 804, memory 810, and one or more communication buses 809 for interconnecting these components. The communication buses 809 may include circuitry (sometimes called a chipset) that interconnects and controls communications between system components. The server 501 may include a user interface 805, for instance, a display 806 and a keyboard 808. When the server 501 is a smart phone or tablet, the user interface 805 may be a touch screen, which is both a display and an input device. Memory 810 may include high speed random access memory and may also include non-volatile memory, such as one or more magnetic disk storage devices. Memory 810 may include mass storage that is remotely located from the CPU's 802. In some embodiments, memory 810 stores the following programs, modules and data structures, or a subset or superset thereof:

an operating system 812 that includes procedures for handling various basic system services and for performing hardware dependent tasks;

a network communication module 814 that is used for connecting the display device 501 to the server, the mobile terminals, and/or other computers via one or more communication networks (wired or wireless), such as the Internet, other wide area networks, local area networks, metropolitan area networks, and so on;

a user interface module 816 configured to receive user inputs through the user interface 805;

and a number of device-side application modules 818 including the following:

a connecting module 310 configured to connect to the server based on a device identifier corresponding to the display device, wherein the display device is uniquely identified by the device identifier at the server and the display device connects to the server through a default connection setup embedded in the device identifier;

an identifying module 320 configured to receive communication requests from the server, wherein each communication request includes a terminal identifier of a respective mobile terminal at the server;

a response module 330, in response to the communication requests, configured to: establish communication channels between the display device and the mobile terminals through the server, add the terminal identifiers of the mobile terminals to a contact list 830 of the display device, and designate different regions of the display device as corresponding to the mobile terminals;

a receiving module 340 configured to receive digital content from one of the mobile terminals display the digital content at a designated region of the display device associated with the corresponding mobile terminal; and a detection module 350 configured to detect ambient visible light, ambient sound, and infrared light, and to terminate displaying the digital contents by the receiving module when ambient visible light and ambient sound are below thresholds and there is infrared light from human body;

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for data transfer from mobile terminals to a display device, the method comprising:

at the display device having one or more processors and memory storing programs executed by the one or more processors, connecting to a server based on a device identifier corresponding to the display device, wherein the display device is uniquely identified by the device identifier at the server and the display device connects to the server through a default connection setup embedded in the device identifier, and the device identifier is a barcode encoding display device information corresponding to the display device;

receiving communication requests from the server, wherein each communication request includes a terminal identifier of a respective mobile terminal at the server and the terminal identifier is a barcode encoding terminal information corresponding to the mobile terminal;

in response to the communication requests:
establishing communication channels between the display device and the mobile terminals through the server;
adding the terminal identifiers of the mobile terminals to a contact list of the display device; and
designating different regions of the display device as corresponding to the mobile terminals;

receiving digital content from one of the mobile terminals; and displaying the digital content at a designated region of the display device associated with the corresponding mobile terminal.

2. The method of claim 1, further comprising:
registering the display device identifier with the server.

3. The method of claim 1, further comprising:
obtaining a second device identifier corresponding to a second display device;
searching for the second display device through the server based on the second device identifier; and
sending digital contents to the second display device so that the second display device displays the digital contents.

4. The method of claim 1, wherein:
the mobile terminal adds the display device to a terminal contact list.

5. The method of claim 1, wherein:
the digital content includes digital pictures and text associated with the digital pictures;
and the step of displaying the digital contents comprises:
 displaying the digital pictures together with the associated text based on a preset format.

6. A method for data transfer from mobile terminals to a display device, the method comprising:
at the display device having one or more processors and memory storing programs executed by the one or more processors,
 connecting to a server based on a device identifier corresponding to the display device, wherein the display device is uniquely identified by the device identifier at the server and the display device connects to the server through a default connection setup embedded in the device identifier;
 receiving communication requests from the server, wherein each communication request includes a terminal identifier of a respective mobile terminal at the server;
 in response to the communication requests:
  establishing communication channels between the display device and the mobile terminals through the server;
  adding the terminal identifiers of the mobile terminals to a contact list of the display device; and
  designating different regions of the display device as corresponding to the mobile terminals;
 receiving digital content from one of the mobile terminals;
 displaying the digital content at a designated region of the display device associated with the corresponding mobile terminal;
 detecting ambient visible light, ambient sound, and infrared light from human body; and
 terminating displaying the digital contents when ambient visible light and ambient sound are below thresholds and there is infrared light from human body.

7. The method of claim 6, further comprising:
registering the display device identifier with the server.

8. The method of claim 6, further comprising:
obtaining a second device identifier corresponding to a second display device;
searching for the second display device through the server based on the second device identifier; and
sending digital contents to the second display device so that the second display device displays the digital contents.

9. The method of claim 6, wherein:
the mobile terminal adds the display device to a terminal contact list.

10. The method of claim 6, wherein:
the digital content includes digital pictures and text associated with the digital pictures;
and the step of displaying the digital contents comprises:
 displaying the digital pictures together with the associated text based on a preset format.

11. A computer system, comprising a server, one or more mobile terminals, and a display device, the display device having:
one or more processors;
memory; and
one or more programs modules stored in the memory and configured for execution by the one or more processors, the one or more program modules including:
 a connecting module configured to connect to the server based on a device identifier corresponding to the display device, wherein the display device is uniquely identified by the device identifier at the server and the display device connects to the server through a default connection setup embedded in the device identifier, and the device identifier is a barcode encoding display device information corresponding to the display device;
 an identifying module configured to receive communication requests from the server, wherein each communication request includes a terminal identifier of a respective mobile terminal at the server and the terminal identifier is a barcode encoding terminal information corresponding to the mobile terminal;
 a response module having a communication subunit, a contact list subunit, and a designation subunit, wherein, in response to the communication requests:
  the communication subunit is configured to establish communication channels between the display device and the mobile terminals through the server;
  the contact list subunit is configured to add the terminal identifiers of the mobile terminals to a contact list of the display device; and
  the designation subunit is configured to designate different regions of the display device as corresponding to the mobile terminals; and
 a receiving module having a receiving subunit and a display subunit, wherein:
  the receiving subunit is configured to receive digital content from one of the mobile terminals; and
  the display subunit is configured to display the digital content at a designated region of the display device associated with the corresponding mobile terminal.

12. The computer system of claim 11, wherein the connecting module is further configured to:
register the display device identifier with the server.

13. The computer system of claim 11, wherein:
the identifying module is further configured to obtain a second device identifier corresponding to a second display device; and search for the second display device through the server based on the second device identifier; and
the receiving module is further configured to send digital contents to the second display device so that the second display device displays the digital contents.

14. The computer system of claim 11, wherein:
the mobile terminal adds the display device to a terminal contact list.

15. The computer system of claim 11, wherein:
the digital content includes digital pictures and text associated with the digital pictures;
and the receiving module is further configured to:
 display the digital pictures together with the associated text based on a preset format.

16. The computer system of claim 11, further comprising:
a detection module having an ambient light subunit, an ambient sound subunit, a infrared subunit, and a control subunit, wherein:
 the ambient light subunit is configured to detect ambient visible light,
 the ambient sound subunit is configured to detect ambient sound, and
 the infrared subunit is configured to detect infrared light from human body, and the control subunit is configured to terminate displaying the digital contents by the receiving module when ambient visible light and ambient sound are below thresholds and there is infrared light from human body.

17. A non-transitory computer readable storage medium having stored therein one or more instructions, which, when executed by a display device, cause the display device to:
  connect to a server based on a device identifier corresponding to the display device, wherein the display device is uniquely identified by the device identifier at the server and the display device connects to the server through a default connection setup embedded in the device identifier, and the device identifier is a barcode encoding display device information corresponding to the display device;
  receive communication requests from the server, wherein each communication request includes a terminal identifier of a respective mobile terminal at the server and the terminal identifier is a barcode encoding terminal information corresponding to the mobile terminal;
  in response to the communication requests:
    establish communication channels between the display device and the mobile terminals through the server;
    add the terminal identifiers of the mobile terminals to a contact list of the display device; and
    designate different regions of the display device as corresponding to the mobile terminals;
  receive digital content from one of the mobile terminals; and
  display the digital content at a designated region of the display device associated with the corresponding mobile terminal.

18. The non-transitory computer readable storage medium of claim 17, wherein the instructions further causes the display device to:
  obtain a second device identifier corresponding to a second display device; and
  search for the second display device through the server based on the second device identifier; and
  send digital contents to the second display device so that the second display device displays the digital contents.

19. The non-transitory computer readable storage medium of claim 17, wherein:
  the digital content includes digital pictures and text associated with the digital pictures;
  and the instructions causes the display device to:
    display the digital pictures together with the associated text based on a preset format.

20. The non-transitory computer readable storage medium of claim 17, wherein the instructions further causes the display device to:
  detect ambient visible light, ambient sound, and infrared light from human body;
  terminate displaying the digital contents when ambient visible light and ambient sound are below thresholds and there is infrared light from human body.

* * * * *